United States Patent

Sheikh et al.

[11] Patent Number: 6,141,227
[45] Date of Patent: Oct. 31, 2000

[54] POWER SUPPLY WITH REDUCED SECOND HARMONIC

[75] Inventors: Haroon Karamat Sheikh; Philip Lipscomb; Michael Richard Leonard, all of Cheltenham, United Kingdom

[73] Assignee: Cheltenham Induction Heating Limited of Phoenix Works, Cheltenham, United Kingdom

[21] Appl. No.: 09/349,251

[22] Filed: Jul. 8, 1999

[30] Foreign Application Priority Data

Jun. 3, 1999 [GB] United Kingdom ............... 9912799

[51] Int. Cl.[7] ...................................... H02M 1/12

[52] U.S. Cl. .............................. 363/41; 363/37

[58] Field of Search ................. 363/34, 37, 40, 363/41, 132

[56] References Cited

U.S. PATENT DOCUMENTS

| 5,327,335 | 7/1994 | Maddali et al. |
| 5,383,107 | 1/1995 | Hopkins et al. ............... 363/41 |
| 5,559,689 | 9/1996 | Kirchberg et al. ............ 363/95 |
| 5,594,630 | 1/1997 | Baker . |
| 5,742,103 | 4/1998 | Ashok . |

Primary Examiner—Shawn Riley
Attorney, Agent, or Firm—Young & Thompson

[57] ABSTRACT

A power supply receives an alternating current which is converted by a fixed rectifier to a direct current. The direct current is converted by an inverter to an alternating current of a desired frequency and provided to a parallel resonant fixed load circuit such as a work-coil of an induction heater. The power supply includes a device for reducing amplitude of at least a second harmonic of a fundamental frequency of the current output by the inverter so that a filter connected to the load circuit can have a roll-off frequency close to the design frequency of the load circuit.

28 Claims, 2 Drawing Sheets

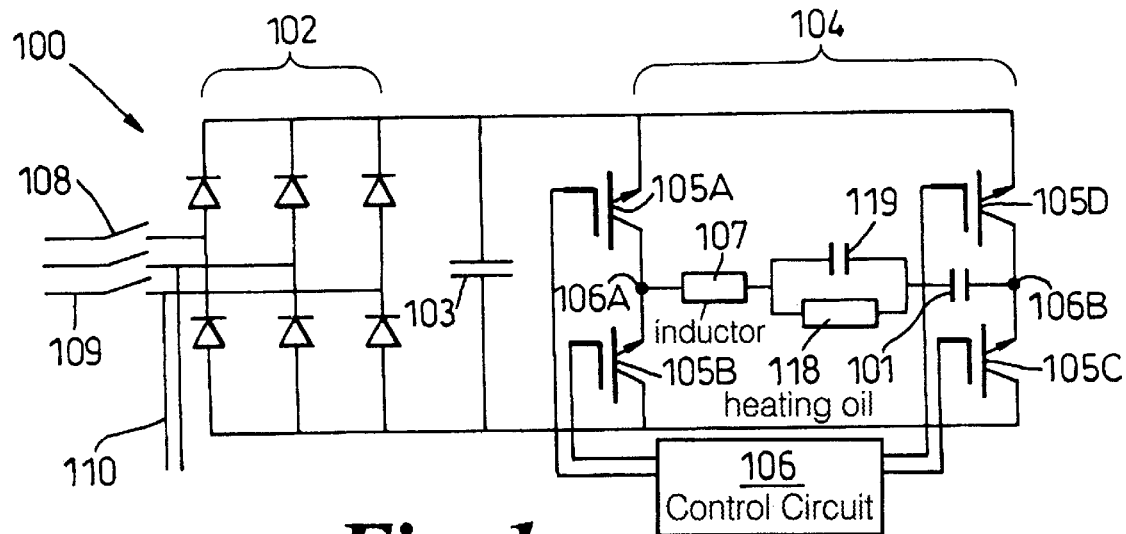
Fig. 1
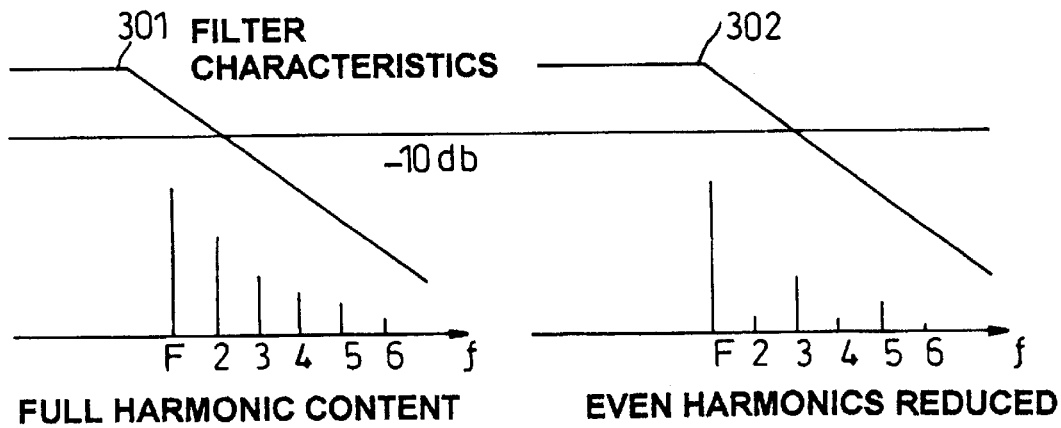
Fig. 3A FULL HARMONIC CONTENT
Fig. 3B EVEN HARMONICS REDUCED
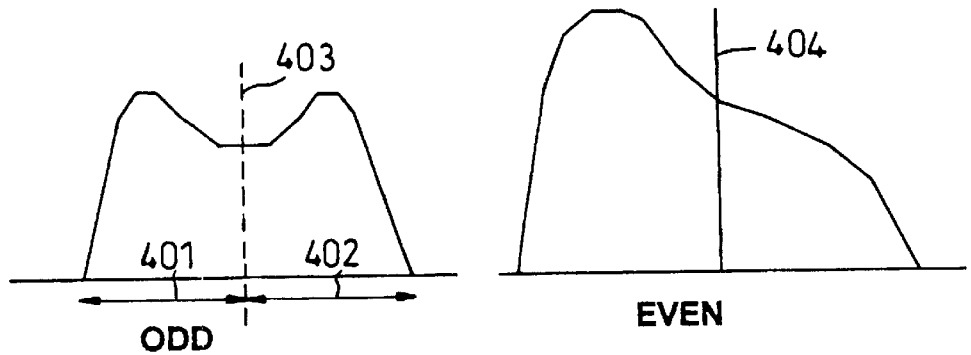
Fig. 4A ODD
Fig. 4B EVEN

POWER SUPPLY WITH REDUCED SECOND HARMONIC

BACKGROUND OF THE INVENTION

The present invention relates to a power supply, more particularly to a power supply for use with a parallel resonant load circuit.

DESCRIPTION OF THE RELATED ART

In known power supplies, such as those used by induction heating apparatus, an alternating current (AC) mains voltage is rectified to produce a direct current (DC) voltage and then fed to an inverter circuit which turns the DC voltage into an AC voltage of a desired frequency. Control of the output power of the apparatus is achieved by varying the DC voltage by controlling the firing angle of a controlled rectifier. The use of a controlled rectifier causes a poor input power factor and widely varying levels of harmonic distortion of the AC mains supply and also some loss of electrical efficiency. The output from a controlled rectifier requires use of substantial smoothing components to condition the DC voltage before feeding it to the inverter circuit. The electronic control circuitry of a controlled rectifier also has a restricted operated frequency range, typically 50 to 60 Hz.

Fixed rectifiers have previously been used in induction heating equipment employing series resonant circuits either as the load circuit, or in addition to the load circuit, to couple the output of an inverter, to a parallel resonant load circuit.

Series resonant load circuits do not provide the user with equipment that is as flexible and simple to match to a range of different loads as parallel resonant load circuits. Unless a bulky transformer is connected and situated near to the load circuit the cables carrying the output power from the inverter to the load circuit need to be capable of carrying "Q" times the current that would need to be carried by cables to an equivalent power parallel resonant output circuit. The value of "Q" can vary in the range 5 through 50, typically 20.

SUMMARY OF THE INVENTION

An object of the present invention is to mitigate problems associated with the use of controlled rectifiers and series resonant load circuits in power supplies by employing a fixed rectifier in combination with a parallel resonant load circuit. Another object of the invention is to provide such an apparatus in significantly smaller size than induction heating apparatus utilizing conventional power supplies. The reduction in size means that production costs can be decreased and also costs for transporting and servicing the induction heating apparatus including the power supply can be reduced.

The invention further includes circuitry for by reducing the amplitude of the second harmonic to shift up the roll-off frequency of a power supply filter and thus reduce significantly the attenuation at the design frequency. The resultant improvement in efficiency enables a parallel resonant circuit to be driven without the need for large transformers and capacitor banks.

The invention has as another object to provide a filter including an inductor connected in series to a load circuit across terminals of an inverter as well as an amplitude reducing design to reduce amplitudes of even-numbered harmonics of the fundamental frequency of the inverter output current and in one embodiment, the amplitude reducing design may be configured to add only odd-numbered harmonics to the fundamental frequency wave-form to produce a resultant wave-form, in which case the amplitude reducing design may be further configured to divide the resultant wave-form into two half wave-forms and adjust a phase relationship between a voltage across the load circuit and the inverter output current until peak amplitudes of the half wave-forms are at east approximately equal.

The adjustment of phase relationship may be achieved by adjusting phase angle between said output current of the inverter and output voltage of the inverter.

In certain circumstances it may be desirable to vary the roll-off frequency to take account for changes in the design frequency or the design frequency range in which case the load circuit may include a core reactor or other variable inductance design.

Alternatively, the filter design may include a plurality of inductors, each inductor having a predetermined inductance value. In which case, the power supply may further select one of the inductors or combination of inductors having an inductance value most appropriate for filtering at least a second harmonic of the found operating frequency. A device for indicating which one of the plurality of inductors has an inductance value most appropriate for filtering at least a second harmonic of the found resonant frequency may be provided.

BRIEF DESCRIPTION OF THE DRAWINGS

The invention may be performed in various ways, and, by way of example only, an embodiment thereof will now be described by way of example only, reference being made to the accompanying drawings, in which:

FIG. 1 illustrates schematically a rectifier, an inverter and a parallel resonant load circuit;

FIGS. 3A–3B and FIGS. 4A–4B explain functions performed by components of the circuit identified in FIG. 2; and

DESCRIPTION OF THE PREFERRED EMBODIMENTS

Figure 2:
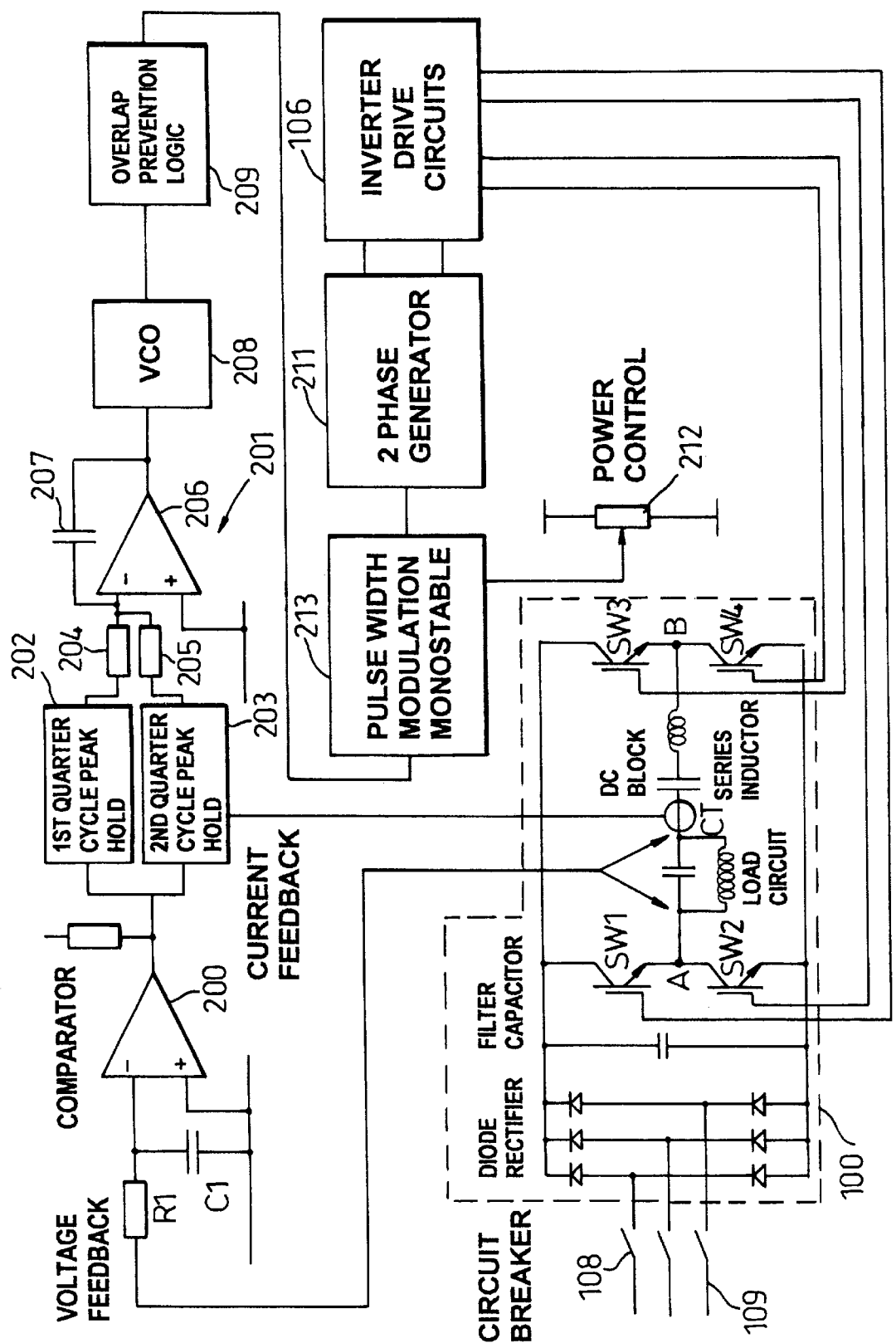
FIG. 2 illustrates a circuit diagram of the preferred embodiment including the circuits of FIG. 1.

In FIG. 1 an alternating current mains power supply 109 is fed into a rectifier means 102, preferably a fixed diode bridge rectifier. A circuit breaker 108 is included between the AC mains supply 109 and the rectifier. The AC mains supply 109 may be of one or more phases, of any frequency that is practical to generate and of any input voltage, typically in the range 30 Hz to 1 KHz and 100 to 500 volts RMS. The voltage and frequency of the supply can be varied during the operation of the equipment with little effect on the output parameters of the inverter. This makes the equipment ideally suited to operate from a poorly regulated AC supply with a wide frequency range, such as provided by a motor generator or on board ships and aircrafts.

A relatively low value smoothing capacitor 103 may be connected across the DC power supply produced by the rectifier in order to provide voltage smoothing at an operating frequency of the inverter. The operating frequency of the inverter is typically in the range 100 Hz to 250 KHz or more. The capacitor 103 is intended to reduce inverter frequency currents that are drawn from the power supply. It is not an essential function of the capacitor 103 to smooth the power supply frequency from the DC voltage fed to the inverter.

The inverter 104 connected across the DC voltage output from the rectifier 102 may be a half bridge or full "H" bridge of switching devices, preferably insulated gate bipolar transistors. In the preferred embodiment, the inverter bridge comprises a total of four transistors, labelled 105A to 105D. Transistors 105A and 105B are connected in series to a first terminal 106A of the inverter. Transistors 105C and 105D are connected in series to a second terminal 106B of the inverter. The transistors 105A to 105D can be switched on and off by the transistor control circuit 106.

When the circuit breaker 108 is closed, the rectifier 102 converts the AC power to a DC power which is supplied to an inverter 104. When output power from the inverter 104 is required for the load, a transistor control circuit 106 switches diagonal arms of the inverter bridge. Leads 110 for providing power to the transistor control circuit 106 are preferably connected between the circuit breaker 108 and the rectifier 102. The diagonal arms are switched on and off alternately, at a frequency above a highest likely operating frequency of the load circuit. This highest likely operating frequency of the load circuit, normally determined by the manufacturers based upon the frequency for heating the load (work coil) most efficiently, is called a "design frequency" of the load circuit. To ensure that a low current flows, a time between switching the diagonal arms from on to off is relatively short, and a time between switching the arms from off to on is relatively long. A resultant voltage generated across the load circuit is fed back a circuit (not shown) intended to detect the resonant frequency of the load circuit.

An inductor 107 is connected in series with the terminals 106A and 106B of the bridge inverter. A DC block capacitor 101 is also connected in series with two output terminals of the inverter bridge. The parallel resonant load circuit, preferably including an induction heating coil 118 in parallel with a power factor correction capacitor 119, is also connected in series with the two output terminals of the inverter bridge. In the preferred embodiment, the load circuit includes a work coil for an induction heater, however, the invention is not limited to this application alone.

Series inductor 107 is intended to provide a simple first order filter for harmonic currents produced by the inverter. The series inductor 107 is intended to cause a small level of attenuation at a fundamental operating frequency of the load circuit and increasing attenuation of higher frequency harmonic currents produced by operation of the inverter. To ensure that there is little or no attenuation of the fundamental operating frequency and a relatively large attenuation of subsequent harmonic frequencies, a power supply in accordance with the preferred embodiment is providing means for reducing amplitude of a second harmonic of the fundamental frequency at least, and preferably reduce amplitudes of subsequent even-numbered harmonics also. This reduction of amplitudes is intended to ensure that the filtering effect of the series inductor 107 can easily discriminate between the fundamental frequency and the next significant harmonic, normally the third harmonic of the fundamental frequency. Thus, a roll-off frequency of the inductor 107 can be higher than in conventional power supplies.

Operation of the resonant frequency detection circuit mentioned above will now be described. The resonant frequency detection circuit steadily reduces the frequency of the power sent by the inverter until it detects that the resonant frequency of the load circuit has been reached, at least approximately, and the correct volt/amp phase relationship has been achieved to reduce amplitudes of even-numbered harmonic frequencies of a fundamental frequency of a current output by the inverter. When this occurs, the frequency is stopped from steadily reducing and preferably commanded to rise and fall in a manner which tracks any change in the resonant frequency of the load circuit that may subsequently occur, and maintains the correct phase relationship to attempt to minimise amplitudes of the even-numbered harmonic frequencies.

When the inverter circuit is operating at or close to the resonant frequency of the load circuit and with reduced even-numbered harmonic production, the width of the pulses delivered to the load via the inverter are modulated to allow the inverter to supply the power required. At all times the resonant frequency detection circuit is intended to ensure operation at the correct frequency for the load circuit, and the even harmonic reduction circuit reduces the production of even-numbered harmonics for efficient operation of the filter means (inductor 107) between the bridge inverter and the load circuit.

To operate the inverter 104, the circuit breaker 108 is closed so that power is provided to the electronic transistor control circuit 106, and the rectifier 102 provides DC input voltage to the inverter. When power is required from the inverter, the transistor control circuit 106 switches on a first diagonally arranged pair of transistors 105A and 105C for a short time, at least approximately equal to one tenth of a half cycle time at a highest expected operating frequency of the load circuit causing a current to flow through the load circuit in one direction. All of the transistors, 105A to 105D, are then switched off for the remainder of the half cycle time. A second diagonal pair of transistors, 105B and 105D, are then switched on for a relatively short time, at least approximately equal to one tenth of the half cycle time at the highest expected operating frequency and the current flows through the load in the other direction. All the transistors 105A to 105D are then switched off for the remainder of the half cycle time. This switching sequence may then be repeated. Although in the preferred embodiment, the pairs of transistors are switched on for around ten percent of the half cycle time, it may be desirable to decrease the amount of time and increase the "switched off" time period accordingly.

This highest expected operating frequency represents a correct operating frequency of the inverter if the load circuit is operating at the highest expected frequency and at minimum output power. It will be understood that the actual resonant frequency varies as workpieces pass through the heating coil 118. To find the correct operating frequency for the inverter in the event that the load circuit is tuned to operate at some unknown frequency below the maximum operating frequency of the inverter, the electronic transistor control circuit 106 reduces the frequency of the drive signals from circuit 106 to the transistors 105A to 105D until the correct operating frequency (i.e. the frequency at which there is a minimum production of even numbered harmonics) is detected. The correct operating frequency at this minimum power operation is defined as a frequency at which a peak of an inverter output current resulting from switching transistor pair 105A, 105C and pair 105B, 105D for this short mark space ratio, is in phase with a peak of a voltage wave-form across the load.

The power output by the inverter is controlled by a form of pulse width modulation that reduces production of even-numbered harmonics whilst controlling the power transferred from the rectifier to the load circuit via the inverter and keeping the operating frequency of the inverter at least approximately equal to the operating frequency of the load circuit.

The circuit diagram of FIG. 2 includes rectifier, inverter and parallel resonant load circuit 100 substantially identical to the components identified in FIG. 1. However, the circuit in FIG. 2 further includes means for supplying current and voltage feedback from the inverter and load circuit.

Voltage feedback from the parallel resonant load circuit is fed to a comparator 200 via a phase shift network comprising a resistor R1, and a capacitor C1. The comparator 200 switches at positive and negative peaks of the voltage fed back from the load circuit.

Output from the comparator 200 activates two parallel sample and hold circuits 202 and 203. The sample and hold circuits are intended to store peak amplitudes of quarters of the inverter output current wave-form (which is fed back from the inverter to circuit 100) preceding and following the switching of the comparator 200. These opposite polarity voltages are then fed into an integrator 201 comprising a resistor 204 connected to sample and hold circuit 202, a resistor 205 connected to sample and hold circuit 203, an op-amp 206 and a feedback capacitor 207. The output of the integrator 201 will rise or fall, depending upon whether the preceding or following quarter cycle was of highest amplitude. When both quarter cycles are of at least approximately equal amplitude, the input to the integrator is zero and the output of the integrator 201 remains constant.

The output of the integrator 201 is fed into a voltage controlled oscillator (VCO) 208 and controls the frequency of the VCO, causing it to run at twice the frequency at which the inverter is operating. The VCO 208 and inverter produce a phase relationship of voltage and current that will keep the output of the integrator at that voltage. Variations in load conditions, or changes of the power output of the inverter that cause changes in the shape of the current wave-form, are detected by the integrator and cause the VCO to change frequency until the error in the current wave-form is corrected, by altering the switching of the transistors in the inverter.

The output from the VCO 208 is received by overlap prevention logic circuit 209. Circuit 209 is included because there may be a short delay between commanding the transistors in the inverter to switch off and their actual response. Circuit 209 is used to add delays onto edges of the transistor control signals sent to the inverter. This prevents the transistors in the inverter from being switched on at the same time, possibly causing damage by fire through.

To control the power output of the inverter, the width of the transistor control pulses produced by circuit 106 are varied by pulse width modulation monostable 213. Narrow pulses are used for low power output, and wider pulses for higher power output. At all times, the pulse width is intended to stay within the range of time prescribed by the overlap prevention logic circuit 209. Variations in load conditions, caused by changing the power output of the inverter, that cause changes in the shape of the current wave-form are detected by the integrator and cause the VCO 208 to change frequency until the error in the current wave-form is corrected.

The pulse width modulation monostable 213 is connected to a two phase generator 211 and power level control 212. The output from the pulse width modulation monostable is divided into two signals by the two phase generator. One of the signals is 180 degrees out of phase with the other signal. These two separate signals are input into the transistor control circuit 106 which are used to operate the transistors in the inverter responsible for providing the AC current. The transistors are operated alternately to provide alternate positive and negative half cycles.

FIG. 3A of the accompany drawings illustrates a graph in a case where amplitudes of even numbered harmonics are not reduced. As can be seen, the harmonic frequencies, labelled 2, 3, 4, 5, 6, of the fundamental frequency F decrease gradually. However, as the amplitude of the second harmonic is still significant, a roll-off point 301 of a filter must be set at a frequency considerably lower than the fundamental frequency F, resulting in attenuation of around 20% of the fundamental frequency.

FIG. 3B illustrates a graph where even-numbered harmonics, i.e 2, 4, 6, of the fundamental frequency F have been reduced. As can be seen, a gap between F and the next significant amplitude, i.e. that of the third harmonic (3), is significantly greater than the gap between F and 2 in FIG. 3A. This means that a roll-off point 302 of a filter can be at a relatively higher frequency, i.e. approximately equal to or even greater than the fundamental/load circuit design frequency, than in the case of FIG. 3A where the amplitudes of the even-numbered harmonics have not been reduced. Preferably, a roll-off frequency of the series inductor used as a filter in the specific embodiment is within a range of +/− 5% of the design frequency.

FIG. 4A of the accompanying drawings comprises a graph illustrating the effect of adding an odd-numbered harmonic to a half cycle of a fundamental frequency sign-wave. The shapes of two halves, 401 and 402, of the resulting wave-form are at least approximately symmetrical about a substantially central dividing line 403.

FIG. 4B comprises a graph illustrating a wave-form resulting from adding an even-numbered harmonic to a half cycle the fundamental sign-wave As can been seen, the resultant wave-form is asymmetric about a central dividing line 404.

The wave-forms illustrated in FIGS. 4A and 4B are typical of current wave-forms that would be present when the pulse width control is adjusted to a maximum pulse width and therefore maximum power output.

To control the inverter 104 such that the current wave-form is intended to contain as minimal an amount of even harmonics as possible, the power supply divides a resultant wave-form into two, in a similar manner to the example of FIG. 4A, and a phase relationship between a voltage across the load and the output current from the inverter is varied until peak amplitudes of wave-forms in the two halves (quarter cycles) either side of a substantially central dividing line are of at least approximately equal amplitude. As the power is increased or decreased by modifying the pulse width of the current fed to the load circuit, the phase angle between the output current and the output voltage is adjusted to keep the current amplitude peaks substantially equal and hence reduce production of even harmonics.

If the substantially central dividing line is derived from a voltage wave-form, then adjusting the phase angle of the current to reduce or minimise even-numbered harmonics also maintains the inverter at the operating frequency of the load circuit. Thus, only two control loops may be necessary to control frequency, reduce amplitudes of even-numbered harmonics and control the power.

In alternative embodiments, the series inductor 107 may be replaced by a plurality of inductors, each having a distinct, predetermined inductance value. In one alternative embodiment, the power supply is capable of selecting one of the inductors, the selection being dependent upon which of the inductors or combination of inductors has an inductance value giving a roll-off frequency for the filter which is most suited to the design or operating frequency of the load circuit. In another alternative embodiment, the power supply may indicate which one or combination of the inductors has the most appropriate value, for example, by switching on an indication light emitting diode (LED) corresponding to one of the inductors. A human operator could then modify the power supply so that an appropriate inductor is connected to the load circuit.

In a further alternative embodiment, the series inductor 107 may he replaced by a variable inductance means, e.g. a core reactor in which case real time variation of the roll-off frequency may be provided.

What is claimed is:

1. A power supply for supplying power to a load circuit intended to operate at a design frequency or within a design frequency range including:
    an input for alternating current;
    rectifier means for converting the alternating current at the input to direct current; and
    inverter means for supplying said direct current to a parallel resonant load circuit, said power supply characterised by including:
    means for reducing amplitude of at least a second harmonic of a fundamental frequency of a current output by said inverter to produce a treated power signal; and
    means for filtering said treated power signal, said filter means having a roll-off frequency at least approximately equal to the design frequency or a frequency in the design frequency range of said load circuit.

2. A power supply according to claim 1, wherein said filter means includes an inductor connected in series to said load circuit across terminals of said inverter.

3. A power supply according to claim 1, wherein said amplitude reducing means is configured to reduce amplitudes of even-numbered harmonics of said fundamental frequency of said inverter output current.

4. A power supply according to claim 1, wherein said inverter includes a bridge including a plurality of switching means.

5. A power supply according to claim 1, wherein said amplitude reducing means is configured to add odd-numbered harmonics to said fundamental frequency waveform to produce a resultant wave-form.

6. A power supply according to claim 5, wherein said amplitude reducing means is further configured to divide said resultant wave-form into two half wave-forms and
    adjust a phase relationship between a voltage across said load circuit and said inverter output current until peak amplitudes of said half wave-forms are at least approximately equal.

7. A power supply according to claim 6, wherein said adjustment of phase relationship is achieved by adjusting phase angle between said output current of said inverter and is output voltage of said inverter.

8. A power supply according to claim 1, wherein said amplitude reducing means includes means for supplying current and voltage feed-back from said load circuit;
    a comparator; and
    a voltage controlled oscillator.

9. A power supply according to claim 1, wherein said inverter means includes a bridge including a plurality of switching means, said power supply further including means for finding a correct operating frequency of said inverter at a minimum power output, wherein said correct operating frequency of said inverter at minimum power operation is a frequency at which a peak currency resulting from a predetermined switching sequence of said switching means is at least approximately in phase with a peak voltage wave form across said load circuit.

10. A power supply according to claim 9, wherein said correct operating frequency of said inverter at minimum power operation is a frequency at which a peak current resulting from a predetermined switching sequence of said switching means is at least approximately in phase with a peak voltage wave-form across said load circuit.

11. A power supply according to claim 10, wherein said predetermined switching sequence includes:
    switching on a first diagonally arranged pair of said switching means for a first time period;
    switching off all said switching means for a second time period;
    switching on a second diagonally arranged pair of said switching means for a third time period; and
    switching off all said switching means for a fourth time period.

12. A power supply according to claim 11, wherein said first and third time periods are at least approximately equal to one tenth of a half cycle time at a highest expected operating frequency; and
    said second and fourth time periods are at least approximately equal to nine tenths of a half cycle time at a highest expected operating frequency.

13. A power supply according to claims 9, wherein said power supply supplies said filtered treated power signal to said load circuit at said found correct operating frequency.

14. A power supply according to claim 1, wherein said filter means includes a core reactor or other variable inductance means.

15. A power supply according to claim 1, wherein said filter means includes a plurality of inductors, each said inductor having a predetermined inductance value.

16. A power supply according to claim 15, further including means for selecting one of said plurality of inductors having an inductance value most appropriate for filtering at least a second harmonic of said found operating frequency.

17. A power supply according to claim 15, further including means for indicating which one of said plurality of inductors has an inductance value most appropriate for filtering at least a second harmonic of said found resonant frequency.

18. A power supply according to claim 1, wherein said switching means comprise insulated gate bipolar transistors.

19. A power supply according to claim 1, wherein said rectifier means includes a fixed rectifier.

20. A power supply according to claim 19, wherein said fixed rectifier further includes a smoothing capacitor.

21. A power supply according to claim 1, wherein said parallel resonant load circuit includes a work coil of an induction heater.

22. An induction heater including a power supply according to any claim 1.

23. A method of supplying power to a load circuit intended to operate at a design frequency or within a design frequency range, said method including steps of:
    receiving alternating current;
    converting said alternating current to direct current;
    supplying said direct current to a parallel resonant load circuit by means of an inverter, said method characterised by including steps of:
    reducing amplitude of at least a second harmonic of a fundamental frequency of a current output by said inverter to produce a treated power signal; and
    filtering said treated power signal, said filtering having a roll-off at least approximately equal to the desired frequency or a frequency in the design frequency range of a load circuit.

24. A method according to claim 23, wherein said step of reducing amplitude includes reducing amplitudes of even-numbered harmonics of said fundamental frequency of said inverter output current.

25. A method according to claim 23, wherein said step of reducing said amplitude includes adding odd-numbered harmonics to said fundamental frequency wave-form to produce a resultant wave-form;

dividing said resultant wave-form into two half wave-forms; and adjusting a phase relationship between a voltage across said load circuit and said inverter output current until peak amplitudes of said half wave-forms are at least approximately equal.

26. A method according to claim 23, further including steps of:

finding operating frequency of said load circuit; and supplying said filtered, treated power signal to said load circuit at said found operating frequency.

27. A method according to claim 26, further including a step of selecting one of a plurality of inductors having an inductance value most appropriate for filtering said treated power signal at said found operating frequency.

28. A method according to claim 26, further including steps of:

selecting one of a plurality of inductors having an inductance value most appropriate for filtering said treated power signal at said found operating frequency and switching on an indication corresponding to said selected inductor.

* * * * *